Patented Apr. 1, 1947

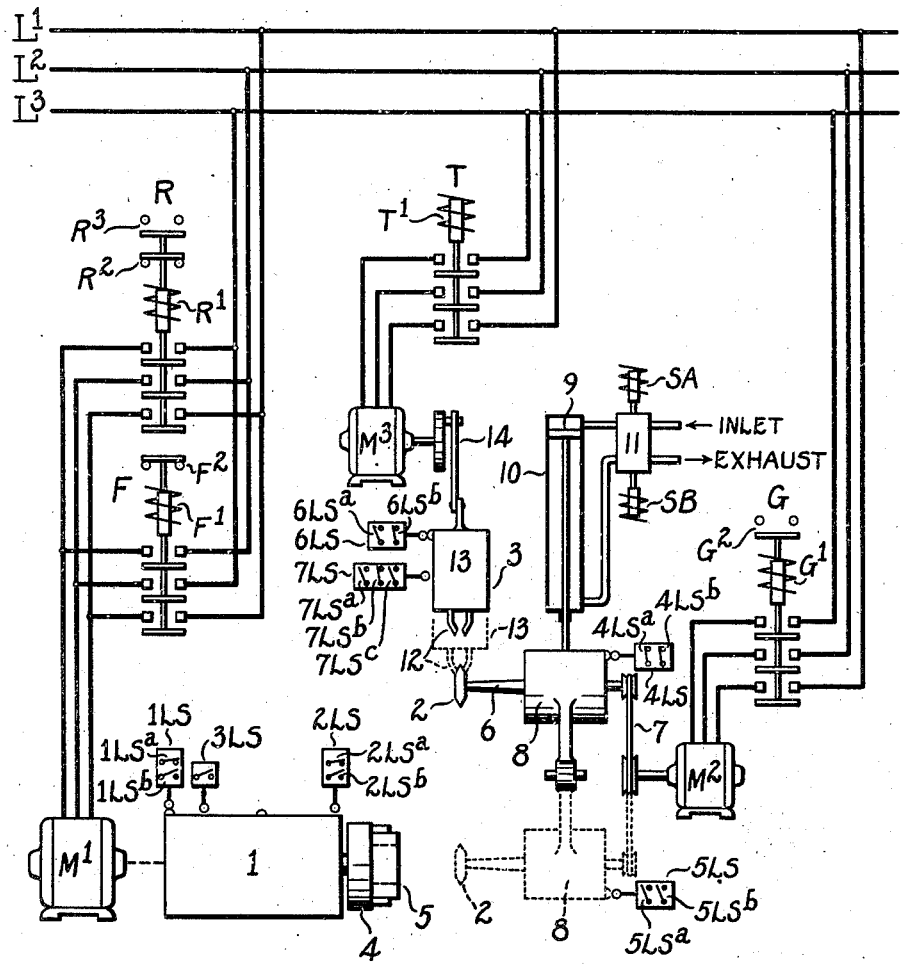

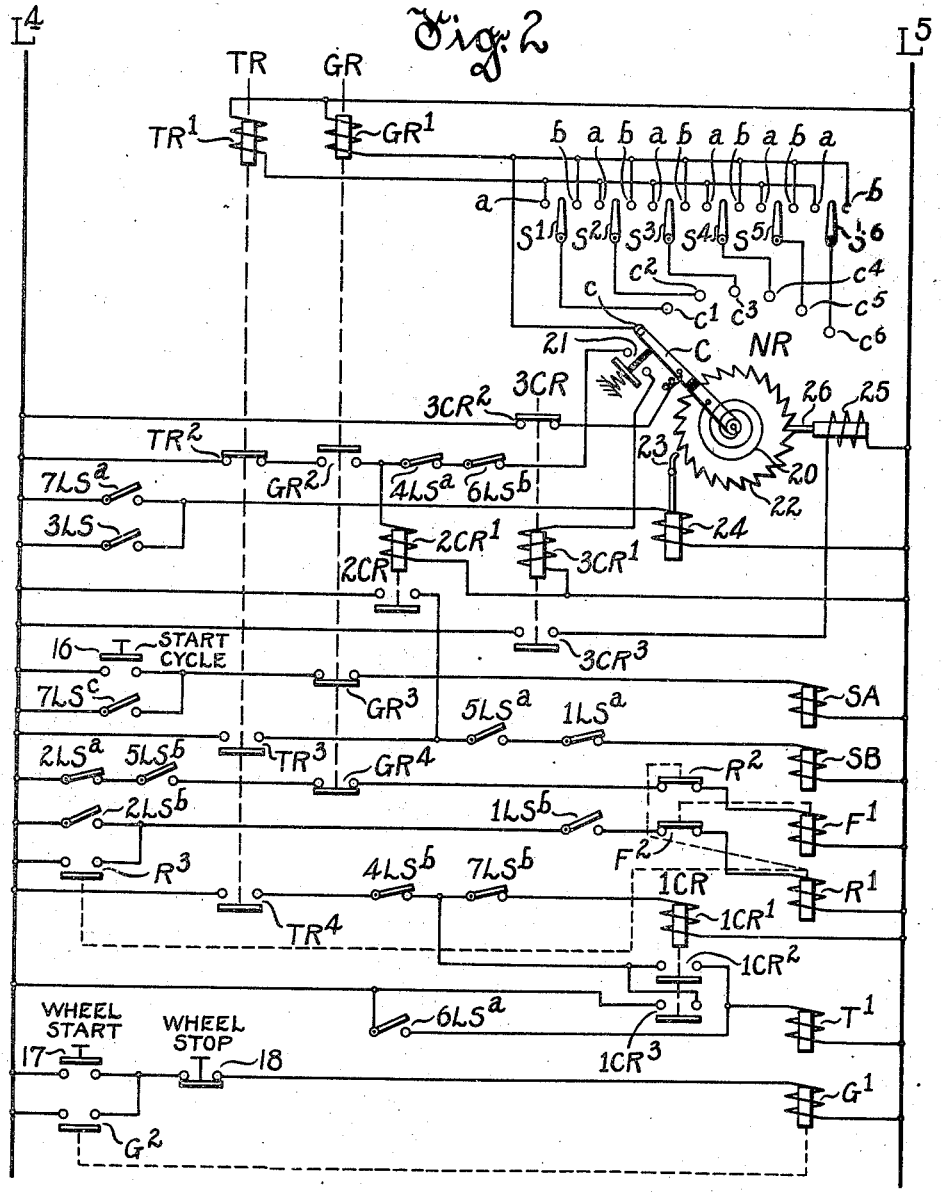

2,418,149

UNITED STATES PATENT OFFICE 2,418,149

MACHINE TOOL CONTROLLER

Walter E. Addicks, Irvington, N. Y., and Robert O. Perrine, Wauwatosa, Wis., assignors to Cutler-Hammer, Inc., Milwaukee, Wis., a corporation of Delaware Application February 26, 1944, Serial No. 524,056

7 Claims. (Cl. 51—95)

1

This invention relates to machine tool controllers, and while not limited thereto is particularly applicable to controllers for machines such as internal thread grinders.

In operating an internal thread grinding machine it is necessary to effect grinding and wheel truing operations in a definite sequence determined by the character of the work being machined, and the present invention has among its objects to provide a program controller for automatically effecting such operations in any desired sequence.

Another object is to provide a unitary controller of the aforesaid character which is adaptable to a wide variety of machining operations, which is reliable in operation and which includes a series of selector switches for programming grinding and truing operations of the machine.

Various other objects and advantages of the invention will hereinafter appear.

The accompanying drawings illustrate an embodiment of the invention which will now be described, it being understood that various modifications may be made in the embodiment illustrated without departing from the spirit and scope of the appended claims.

In the drawings,

Figure 1 is a schematic view illustrating an internal thread grinding machine and also certain elements for controlling grinding and truing operations thereof; and Fig. 2 is a diagrammatic view illustrating a program controller embodying the control elements illustrated in Fig. 1.

Referring to Fig. 1, the same schematically illustrates an internal thread grinding machine including a head stock 1, a circular grinding wheel 2, and a wheel truing mechanism 3. Head stock 1 carries a rotatable chuck 4 for receiving a blank 5 to be internally threaded and a motor M¹ is provided for rotating said chuck and for also effecting forward and return movements of the head stock in timed relation to the rotation of said chuck. Grinding wheel 2 is fixed to a rotatable spindle 6 which is driven by a motor M² through the medium of a belt drive 7. During a grinding operation wheel 2 is held against bodily movement in a position illustrated by dotted lines and upon forward movement of head stock 1 out of a given starting position wheel 2 engages within an opening in blank 5 to internally thread the same. Head stock 1 is advanced during each revolution of chuck 4 a distance equal to the pitch of the thread to be ground in blank 5 and upon completion of a grinding operation head stock

2

1 is returned to starting position. It is the usual practice to provide the grinding machine with a mechanism which acts automatically to maintain wheel 2 out of engagement with blank 5 during return movement of head stock 1 to starting position.

The spindle 6 of grinding wheel 2 is journaled within a pivoted support 8 which is movable by a fluid pressure operated piston 9 to swing said grinding wheel in opposite directions between a normal position illustrated by full lines and the grinding position illustrated by dotted lines. Piston 9 is movable within a stationary cylinder 10 having an electromagnetic control valve 11 associated therewith which is controlled by a pair of solenoids SA and SB. Upon momentary energization of solenoid SA piston 9 operates to move grinding wheel 2 into its dotted line position for a grinding operation and upon momentary energization of solenoid SB said piston operates to return said grinding wheel to its full line position.

With grinding wheel 2 in its full line normal position the periphery thereof is adapted to be trued by the truing mechanism 3. Said truing mechanism is provided with the usual diamond points 12 which are mounted upon a reciprocable carriage 13. Carriage 13 is normally in the position illustrated by full lines and is operated by a motor M³ through the medium of a crank drive 14 to move the diamond points 12 into and out of engagement with the periphery of wheel 2.

Figure 1 illustrates a simplified means for controlling the operation of the driving motors for head stock 1, grinding wheel 2 and the truing mechanism 3. As shown, motors M¹, M² and M³ are supplied with current from a 3 phase supply circuit indicated by lines L¹, L², L³ and motor M¹ is controlled by a pair of electromagnetic reversing switches F and R; motor M² is controlled by an electromagnetic switch G and motor M³ is controlled by an electromagnetic switch T.

For a purpose hereinafter set forth head stock 1 is provided with limit switches 1LS, 2LS and 3LS; wheel support 8 is provided with limit switches 4LS and 5LS and carriage 13 is provided with limit switches 6LS and 7LS. Limit switch 1LS is provided with contacts 1LSᵃ and 1LSᵇ, the former being closed and the latter being open when head stock 1 is in starting position. Limit switch 2LS is provided with normally closed contacts 2LSᵃ and normally open contacts 2LSᵇ which are operated upon movement of head stock 1 into its forward limit. Limit switch 3LS is provided with normally open contacts which remain in open position during forward movement of head stock 1 and are closed momentarily during return movement of the head stock into starting position. Limit switch 4LS is provided with contacts 4LS$^a$ and 4LS$^b$ which are closed upon movement of wheel 2 into truing position, and limit switch 5LS is provided with normally open contacts 5LS$^a$ and 5LS$^b$ which are closed upon movement of said wheel into grinding position. Limit switch 6LS is provided with contacts 6LS$^a$ and 6LS$^b$, the former being open and the latter being closed when carriage 13 is in normal position, and limit switch 7LS is provided with normally open contacts 7LS$^a$ and 7LS$^c$ and normally closed contacts 7LS$^b$ which are operated upon movement of carriage 3 into truing position.

Referring now to Fig. 2, the same illustrates a program controller for controlling switches F, R, T, G and valve solenoids SA and SB to effect grinding and truing operations of the internal thread grinder in a selected sequence. Said controller includes the aforementioned limit switches, a plurality of electromagnetic relays GR, TR, 1CR, 2CR and 3CR, a plurality of manual selector switches S$^1$ to S$^6$ and an electromagnetic notching relay NR. Also said controller includes a normally open start cycle push button 16, a normally open wheel start push button 17 and a normally closed wheel stop push button 18.

As hereinafter set forth, relay GR is responsive to initiate a grinding operation of the machine and relay TR is responsive to initiate a truing operation thereof. Relays GR and TR are controlled by the notching relay NR through the medium of the selector switches S$^1$ to S$^6$. As shown, notching relay NR is provided with a rotatable contact arm C which is normally held by a spring 20 in the position shown in the drawing to engage a stationary contact $c$ and to also maintain an auxiliary switch 21 in open position. Contact arm C is movable out of normal position in a step by step manner to successively engage stationary contacts $c^1$ to $c^6$ by a ratchet wheel 22 having an operating pawl 23 and a holding pawl 26 associated therewith. Pawl 23 is operated by a winding 24 and pawl 26 is tripped by a winding 25. Selector switches S$^1$ to S$^6$ are respectively connected to contacts $c^1$ to $c^6$ and each of said selector switches has an intermediate off position and is movable in one direction out of off position to engage a stationary contact $a$ and in the other direction out of off position to engage a stationary contact $b$.

The function and operation of the aforedescribed controller and also the circuit connections thereof will now be more fully set forth.

Assuming that a work cycle is to be started, switches F, R, G and T are in open position and head stock 1, wheel support 8 and carriage 3 of the internal thread grinder are positioned as shown in full lines in Fig. 1. Also the control arm C of notching relay NR is positioned as shown in Fig. 2 to establish circuit from line L$^4$ through contacts 3CR$^2$ of relay 3CR through contact arm C to stationary contact $c$ and through the grind relay operating winding GR$^1$ to line L$^5$. Relay GR is thus energized to close its associated contacts GR$^3$ and GR$^4$ and to open its associated contacts GR$^2$.

Prior to starting of a work cycle push button 17 is depressed to connect the operating winding G$^1$ of switch G across lines L$^4$, L$^5$ through the medium of stop push button 18. Switch G then responds to energize the wheel motor M$^2$. Switch G is provided with normally open auxiliary contacts G$^2$ and upon release of push button 17 said switch is maintained energized through the medium of said auxiliary contacts and stop push button 18.

With wheel motor M$^2$ in operation, push button 16 is momentarily depressed to effect starting of the work cycle. Upon closure of push button 16 valve solenoid SA is connected across lines L$^4$, L$^5$ through the medium of contacts GR$^3$ of grinding relay GR and piston 9 then operates to move grinding wheel 2 from its full line truing position into the grind position illustrated by dotted lines. Upon movement of wheel 2 into grinding position, limit switch contacts 5LS$^b$ close to connect the operating winding F$^1$ of switch F across lines L$^4$, L$^5$ through the medium of limit switch contacts 2LS$^a$, grind relay contacts GR$^4$ and normally closed auxiliary contacts R$^2$ associated with reversing switch R. Switch F then responds and motor M$^1$ operates to move head stock 1 forwardly for a grinding operation. Upon forward movement of head stock 1 out of starting position limit switch 1LS operates to open contacts 1LS$^a$ and to close contacts 1LS$^b$ and upon completion of the grinding operation limit switch 2LS is operated to open contacts 2LS$^a$ and close contacts 2LS$^b$. Opening of limit switch contacts 2LS$^a$ interrupts the aforedescribed energizing circuit for switch F and upon dropping out of switch F the operating winding R$^1$ of switch R is connected across lines L$^4$, L$^5$ through the medium of limit switch contacts 2LS$^b$, 1LS$^b$ and auxiliary contacts F$^2$ associated with switch F. Switch R thus responds to effect operation of motor M in a reverse direction for return of head stock 1 to starting position. Upon movement of headstock 1 out of its forward limit, limit switch contacts 2LS$^b$ are opened but switch R is maintained energized by closure of its auxiliary contacts R$^3$. Upon return of head stock 1 into starting position, switch R is deenergized by opening of limit switch contacts 1LS$^b$ to effect stopping of motor M$^1$.

Prior to full return of head stock 1 to starting position, limit switch 3LS closes to connect the operating winding 24 of notching relay NR across lines L$^4$, L$^5$ and contact arm C is thus moved out of normal position into engagement with stationary contact $c^1$ to establish circuit from line L$^4$ through contacts 3CR$^2$ to selector switch S$^1$.

Assuming that selector switch S$^1$ is set to engage its associated stationary contact $b$, grinding relay GR is energized upon movement of contact C into engagement with contact $c^1$ and upon return of head stock 1 to starting position switch F is again energized through the medium of limit switch contacts 2LS$^a$ and 5LS$^b$, grind relay contacts GR$^4$ and auxiliary contacts R$^2$ of switch R. Switch F is thus reclosed and the controller will operate as hereinbefore described to move head stock 1 into its forward limit for grinding operation and then return the same to starting position. During return of head stock 1 to grinding position, after the aforedescribed second grinding operation, limit switch 3LS again operates to energize winding 24 for movement of contact arm C into engagement with stationary contact $c^2$.

However, assuming that switch S$^1$ is set to engage its associated stationary contact $a$, grind relay GR will be deenergized when contact arm $c$ moves into engagement with contact $c^1$, and truing relay TR will be energized to effect opening of its associated contacts TR$^2$ and closure of its associated contacts TR$^3$ and TR$^4$. Upon return of head stock 1 to starting position valve solenoid SB will be connected across lines L⁴ and L⁵ through the medium of truing relay contacts TR³ and limit switch contacts 5LSᵃ and 1LSᵃ. Upon energization of solenoid, SB valve 11 is actuated to effect operation of piston 9 for movement of wheel 2 from its dotted line grinding position into the truing position illustrated by full lines. Upon movement of wheel 2 out of grinding position limit switch 5LSᵃ opens to interrupt the aforedescribed energizing circuit for valve solenoid SB and upon movement of said wheel into truing position limit switch contacts 4LSᵇ close to connect the operating winding of relay 1CR across the lines L⁴, L⁵ through the medium of truing relay contacts TR⁴ and limit switch contacts 7LSᵇ. Upon response of relay 1CR the operating winding T¹ of switch T is connected across lines L⁴, L⁵ through the medium of contacts 1CR² and 1CR³ and switch T then responds to effect energization of motor M³. Carriage 3 is thus operated to move the diamond points 12 into and out of engagement with wheel 2 for truing thereof. Upon movement of carriage 13 out of normal position limit switch contacts 6LSᵃ close to maintain switch T energized for forward and return movements of carriage 13. Upon movement of carriage 13 into its forward limit, limit switch 7LS is momentarily operated to interrupt the energizing circuit of relay 1CR by opening of contacts 7LSᵇ and to establish an energizing circuit for the operating winding 24 of notching relay NR by closure of contacts 7LSᵃ. Notching relay NR is thus energized to move contact arm C into engagement with stationary contact c².

Assuming that selector switch S² is set to engage its associated stationary contact a truing relay TR is energized upon movement of contact arm C into engagement with contact c². Relay 1CR is thus energized upon return of carriage 13 to normal position through the medium of truing relay contacts TR⁴ and limit switch contacts 4LSᵇ and 7LSᵇ to maintain switch T energized for a second truing operation. However, assuming that selector switch S² is set to engage its associated stationary contact b truing relay TR drops out and grind relay GR responds upon movement of contact arm C into engagement with stationary contact c². Also relay 1CR is deenergized by opening of limit switch contacts 7LSᵇ and switch T is maintained energized by limit switch contacts 6LSᵃ. Upon return of carriage 13 to normal position, limit switch contacts 6LSᵃ open and switch T drops out to stop motor M³. Upon response of grind relay GR, valve operating solenoid SA is momentarily energized through the medium of limit switch contacts 7LSᶜ and grind relay contacts GR³, and the controller will operate as hereinbefore set forth to effect a grinding operation of the machine.

From the foregoing it is apparent that notching relay NR operates in a step by step manner to effect grinding and truing operations of the machine in a sequence determined by the setting of the several selector switches S. As will now be set forth, the machine is automatically stopped and the controller is automatically reset in normal position upon completion of a selected sequence of grinding and truing operations.

Assuming that one of the selector switches, as for example selector switch S⁵, is set to engage its associated contact b for a final grinding operation and that selector switch S⁶ is in neutral position. After the final grinding operation head stock 1 returns to starting position and limit switch 3LS closes to energize operating winding 24 for movement of contact arm C from stationary contact c⁵ into engagement with stationary contact c⁶. Grind relay GR¹ is thus deenergized and upon dropping out thereof the operating winding 2CR¹ of relay 2CR is connected across lines L⁴, L⁵ through the medium of truing relay contacts TR² and grind relay contacts GR². Upon return of head stock 1 to starting position limit switch contacts 1LSᵇ are opened to deenergize switch R for stopping of motor M¹ and limit switch contacts 1LSᵃ are closed to energize valve operating solenoid SB through the medium of relay 2CR and limit switch contacts 5LSᵃ. Piston 9 then operates to move grinding wheel 2 into its truing position and upon movement of said wheel out of grinding position limit switch contacts 5LSᵃ are opened to interrupt the energizing circuit for valve operating solenoid SB. Limit switch contacts 4LSᵃ close upon movement of grinding wheel 2 into truing position and an energizing circuit for the operating winding 3CR¹ of relay 3CR is then established through the medium of truing relay contacts TR², grind relay contacts GR², limit switch contacts 6LSᵇ and the auxiliary switch 21 associated with notching relay NR. Relay 3CR responds and in responding the contacts 3CR² thereof open to interrupt circuit from line L⁴ to contact arm C and the contacts 3CR³ thereof close to establish an energizing circuit for the trip coil 25 of notching relay NR. Pawl 26 is thus tripped to permit return of contact arm C to normal position under the action of spring 20. Upon return of contact arm C to normal position auxiliary switch 21 is opened to interrupt the energizing circuit for relay 3CR and grind relay GR is energized through the medium of stationary contact c of the notching relay. Upon response of grind relay GR contacts GR² are opened to deenergize relay 2CR and contacts GR³ are closed for a repeat work cycle upon depression of push button 16.

Assuming that selector switch S⁵ is set to engage its associated stationary contact a for a final truing operation and that selector switch S⁶ is in neutral position. During the final truing operation, limit switch 7LS is momentarily operated to open its contacts 7LSᵇ and to close its contacts 7LSᵃ. Opening of limit switch contacts 7LSᵇ interrupts the aforedescribed energizing circuit for relay 1CR and upon dropping out of said relay switch T is maintained energized by limit switch contacts 6LSᵃ pending return of carriage 13 to normal position. Closure of limit switch contacts 7LSᵃ effects energization of operating winding 24 for movement of contact arm C from stationary contact c⁵ into engagement with stationary contact c⁶. Truing relay TR is thus deenergized and upon dropping out thereof relay 2CR is energized through the medium of contacts TR² and GR². Relay 2CR then responds but at this time the same does not function since limit switch contacts 5LSᵃ are in open position. Upon return of carriage 13 to normal position limit switch contacts 6LSᵇ close to establish the aforedescribed energizing circuit for relay 3CR. Trip winding 25 is thus energized for return of contact arm C to normal position, and as hereinbefore set forth the controller is reset for a repeat work cycle by depression of push button 16.

What we claim as new and desire to secure by Letters Patent is:

1. In a machine tool controller, in combination, a first control switch operable to effect one operation of the machine, a second control switch operable to effect a different operation of the machine, a controller biased toward a given normal operating position and having a ratchet operating mechanism associated therewith for effecting step by step advance thereof out of normal position into a plurality of other operating positions, selector means associated with said controller for rendering one or the other of said control switches effective for operation of the machine in each of the operating positions of said controller, means for controlling said ratcheting mechanism to effect an advance step of operation of said controller in response to either of the aforementioned operations of said machine and for permitting return of said controller to normal position upon completion of a selected sequence of operations of the machine, and means for rendering said selector means ineffective for control of said switches during return of said control device to normal position.

2. In a controller for effecting different operations of a machine tool in a preselected sequence, in combination, a plurality of selector switches and a control switch operable in a step by step manner out of a given normal position to successively establish circuit to said selector switches to render the same effective for control of the machine tool, said selector switches each having an off position and being settable in different positions for different operations of the machine, and means for effecting an advance step of operation of said control switch in response to each operation of the machine.

3. In a controller for effecting different operations of a machine tool in a preselected sequence, in combination, a plurality of selector switches and a control switch operable in a step by step manner out of a given normal position to successively establish circuit to said selector switches to render the same effective for control of the machine tool, said selector switches each having an off position and being settable in different operating positions for different operations of the machine and operating means for said controller for effecting a step of operation thereof in response to each operation of the machine and for returning the same to normal position upon movement of the controller into a position to establish circuit to a selector switch set in off position.

4. In a controller for effecting different operations of a machine tool in a preselected sequence, in combination, a plurality of selector switches and a control switch operable in a step by step manner out of a normal position to successively establish circuit to said selector switches to render the same effective for control of the machine tool, said selector switches each having an off position and being settable in different operating positions for different operations of the machine and operating means for said controller for effecting a step of operation thereof in response to each operation of the machine and for returning the same to normal position upon movement of said controller into a position to establish circuit to a selector switch set in off position, and means for rendering said selector switches ineffective during return of said controller to normal position.

5. In a grinding machine controller, in combination, a plurality of selector switches and a control switch operable in a step by step manner out of a given normal position to successively establish circuit to said selector switches to render the same effective for control of the machine, said selector switches each having an off position and being settable in one operating position for a grinding operation of the machine and in another operating position for a truing operation thereof, and said control switch having operating means associated therewith for effecting a step of operation thereof prior to completion of either a grinding or a truing operation of the machine.

6. In a grinding machine tool controller, in combination, a plurality of selector switches and a control switch operable in a step by step manner out of a given normal position to successively establish circuit to said selector switches to render the same effective for control of the machine, said selector switches having an off position and being movable into one operative position for a grinding operation of the machine and into another operative position for a truing operation thereof, and means for effecting a step of operation of said control switch away from normal position in response to either a grinding or a truing operation of the machine and for returning said control switch to normal position upon operation thereof into a position wherein the same establishes circuit to a selector switch set in off position.

7. In a grinding machine tool controller, in combination, a plurality of selector switches and a control switch operable in a step by step manner out of a given normal position to successively establish circuit to said selector switches to render the same effective for control of the machine, said selector switches having an off position and being movable into one operative position for a grinding operation of the machine and into another operative position for a truing operation thereof, and means for effecting a step of operation of said control switch away from normal position in response to either a grinding or a truing operation of the machine and for returning said control switch to normal position upon operation thereof into a position wherein the same establishes circuit to a selector switch set in off position, and means for rendering said selector switches ineffective for control of the machine during return of said control switch to normal position.

WALTER E. ADDICKS.
ROBERT O. PERRINE.

REFERENCES CITED

The following references are of record in the file of this patent:

UNITED STATES PATENTS

| Number | Name | Date |
| --- | --- | --- |
| 1,684,486 | Guild et al. | Sept. 18, 1928 |
| 2,192,308 | Greiner et al. | Mar. 5, 1940 |
| 2,292,875 | Flanders | Aug. 11, 1942 |
| 2,317,226 | Seyferth | Apr. 20, 1943 |